United States Patent
Itabashi et al.

(10) Patent No.: US 9,468,916 B2
(45) Date of Patent: Oct. 18, 2016

(54) METHOD FOR PRODUCING PAU ZEOLITE

(71) Applicants: UniZeo Co., Ltd., Tokyo (JP); THE UNIVERSITY OF TOKYO, Tokyo (JP)

(72) Inventors: Keiji Itabashi, Tokyo (JP); Tatsuya Okubo, Tokyo (JP); Kenta Iyoki, Tokyo (JP)

(73) Assignees: UniZeo Co., Ltd., Tokyo (JP); The University of Tokyo, Tokyo (JP)

( * ) Notice: Subject to any disclaimer, the term of this patent is extended or adjusted under 35 U.S.C. 154(b) by 203 days.

(21) Appl. No.: 14/391,545

(22) PCT Filed: Apr. 9, 2013

(86) PCT No.: PCT/JP2013/060701
§ 371 (c)(1),
(2) Date: Oct. 9, 2014

(87) PCT Pub. No.: WO2013/154095
PCT Pub. Date: Oct. 17, 2013

(65) Prior Publication Data
US 2015/0086474 A1    Mar. 26, 2015

(30) Foreign Application Priority Data
Apr. 10, 2012  (JP) .................................. 2012-089030

(51) Int. Cl.
*C01B 39/02*   (2006.01)
*B01J 29/70*   (2006.01)
(Continued)

(52) U.S. Cl.
CPC ............. *B01J 29/70* (2013.01); *B01J 20/3085* (2013.01); *C01B 39/02* (2013.01); *C01B 39/46* (2013.01); *Y02P 30/10* (2015.11)

(58) Field of Classification Search
CPC ......... C01B 39/02; C01B 39/40; B01J 29/70; Y02P 30/10
See application file for complete search history.

(56) References Cited

U.S. PATENT DOCUMENTS

| | | | |
|---|---|---|---|
| 4,661,332 A | | 4/1987 | Vaughan et al. |
| 5,013,536 A | * | 5/1991 | Vaughan .................. C01B 39/48 423/705 |
| 2012/0190534 A1 | * | 7/2012 | Itabashi .................. C01B 39/46 502/60 |

FOREIGN PATENT DOCUMENTS

| | | |
|---|---|---|
| EP | 0213739 A2 | 3/1987 |
| EP | 0356082 A2 | 2/1990 |

(Continued)

OTHER PUBLICATIONS

Greenaway et al, "Structural changes of synthetic paulingite (Na,H-ECR-18) upon dehydration and CO2 adsorption", Z Kristallogr. 2015 pp. 223-231.*

(Continued)

*Primary Examiner* — David M Brunsman
(74) *Attorney, Agent, or Firm* — Locke Lord LLP

(57) ABSTRACT

Provided is a method that is for producing a PAU zeolite and that can have an environmental impact that is reduced while, as much as possible, not using a structure-defining agent. The method for producing a PAU zeolite produces by means of (1) mixing a silica source, an alumina source, an alkali source, and water in a manner so as to result in a reaction mixture having a composition represented by a specific mole ratio, (2) using as the seed crystal a PAU zeolite that does not contain organic compounds and has a $SiO_2/Al_2O_3$ ratio of 4-15 and an average particle size of at least 100 nm, and adding same to the reaction mixture at a ratio of 0.1-20 wt % with respect to the silica component in the reaction mixture, and (3) subjecting the reaction mixture to which the seed crystal has been added to sealed-vessel heating at 80-200° C.

7 Claims, 2 Drawing Sheets

EXAMPLE 1

(51) Int. Cl.
*C01B 39/46* (2006.01)
*B01J 20/30* (2006.01)

(56) References Cited

FOREIGN PATENT DOCUMENTS

| | | |
|---|---|---|
| JP | 62-70224 A | 3/1987 |
| JP | 3-126613 A | 5/1991 |
| JP | 2006-182792 A | 7/2006 |
| JP | 2011-126768 A | 6/2011 |

OTHER PUBLICATIONS

Vaughan et al., "Synthesis of ECR-18—a synthetic analog of paulingite", Microporous and Mesoporous Materials, 1999, pp. 233-239, vol. 28.

Kim et al., "Synthesis and characterization of a gallosilicate analog of zeolite paulingite", Microporous and Mesoporous Materials, 2005, pp. 319-325, vol. 83.

Lapshin et al., "Distribution of Extraframework Cations and Water Molecules in the Structure of Synthetic Paulingite", Glass Physics and Chemistry, 2011, pp. 72-77, vol. 37, No. 1.

Xie et al., "Organotemplate-Free and Fast Route for Synthesizing Beta Zeolite", Chemistry of Materials, Jul. 22, 2008, pp. 4533-4535, vol. 20, No. 14.

International Search Report dated Jul. 9, 2013, issued in corresponding application No. PCT/JP2013/060701.

Extended European Search Report dated Feb. 20, 2015, issued in corresponding European Patent Application No. 13775810.8 (5 pages).

* cited by examiner

SEED CRYSTAL

EXAMPLE 1

EXAMPLE 2

METHOD FOR PRODUCING PAU ZEOLITE

This application is a 371 filing of PCT/JP2013/060701, filed Apr. 9, 2013.

TECHNICAL FIELD

The present invention relates to a method for producing a PAU zeolite, in which the PAU zeolite that is no organic compounds is added as a seed crystal, and thereby the PAU zeolite is produced from a reaction mixture that does not use the organic compound.

BACKGROUND ART

A synthetic zeolite is crystalline aluminosilicate, and has uniform pores that are attributed to a crystal structure thereof and has an angstrom size. Taking advantage of such a feature, the synthetic zeolite is industrially used as a molecular sieving adsorbent that adsorbs only a molecule having a specific size, an adsorption separating agent that adsorbs a molecule having strong affinity, or a catalytic base. PAU is a name that represents a skeleton structure species given to a paulingite zeolite, and a zeolite having the same structure is ECR-18. The PAU zeolite is used as, for instance, an olefin synthesizing catalyst in the petrochemical industry (see Patent Document 1).

Conventionally, the PAU zeolite has been produced only by a method of using it as an organic structure defining agent (hereinafter abbreviated to "OSDA") such as a tetraethylammonium ion (see Non-patent Documents 1 to 3). For this reason, to obtain the PAU zeolite, the use of the OSDA has been considered to be essential. Further, since the synthesized PAU zeolite contains the OSDA, it has been considered that it is inevitable to fire the PAU zeolite to remove the OSDA before the PAU zeolite is used.

A method of synthesizing the PAU zeolite is described, for instance, in Non-document Documents 1 to 3 described above. A typical method is a method of using the tetraethylammonium ion as the OSDA under the coexistence of a sodium ion and a potassium ion. However, the OSDA is expensive, and what is more, most of the PAU in a mother liquid after PAU zeolite crystallization is terminated is sometimes decomposed. Further, since these OSDAs are incorporated into a crystal of a zeolite to be created, it is necessary to fire the zeolite to remove the OSDAs when the zeolite is used as the adsorbent or the catalyst. In that case, exhaust gases are responsible for environmental pollution, and further, many chemicals are required for detoxification treatment of a synthetic mother liquid containing decomposition products of the OSDA. In this way, the method of synthesizing the PAU zeolite using the OSDA is not only an expensive method but also a production method having a great environmental load. As such, there is a need for a production method of using no OSDA and realization of the PAU zeolite that is obtained by such a production method and essentially contains no organic substances.

Patent Document 1: Japanese Unexamined Patent Application, Publication No. 2006-182792
Non-patent Document 1: Microporous and Mesoporous Materials, 28 (1999), 233 to 239
Non-patent Document 2: Microporous and Mesoporous Materials, 83 (2005), 319 to 325
Non-patent Document 3: Glass Physics and Chemistry, 37 (2011), 72 to 77

DISCLOSURE OF THE INVENTION

Problems to be Solved by the Invention

An object of the present invention is to provide a method for producing a PAU zeolite that essentially contains no organic substances, that is a method capable of producing a PAU zeolite, which can overcome a disadvantage which the aforementioned prior art has to reduce an environmental load as far as possible and produce the PAU zeolite at a low cost without using an organic structure defining agent (OSDA).

Means for Solving the Problems

The present invention is to provide a method for producing a PAU zeolite, which includes:
(1) mixing a silica source, an alumina source, an alkali source, and water so as to be a reaction mixture having a composition represented by a molar ratio given below;
$SiO_2/Al_2O_3$=8 to 24
$K_2O/SiO_2$=0.3 to 0.7
$H_2O/SiO_2$=5 to 50
(2) using an organic compound-free PAU zeolite, in which the $SiO_2/Al_2O_3$ ratio ranges from 4 to 15 and a mean particle size is equal to or more than 100 nm, as a seed crystal, and adding the organic compound-free PAU zeolite to the reaction mixture at a rate of 0.1 to 20% by weight with respect to a silica component in the reaction mixture; and
(3) airtightly heating the reaction mixture to which the seed crystal is added at 80 to 200° C.

Effects of the Invention

According to the present invention, a PAU zeolite in which no organic substances are contained is added as a seed crystal, and thereby the PAU zeolite is produced from a reaction mixture that uses no OSDA. As such, the obtained PAU zeolite essentially contains no organic substances. Accordingly, the PAU zeolite requires neither firing treatment prior to being used nor exhaust gas treatment because no organic substances are generated in spite of dehydration treatment. It is possible to produce the PAU zeolite that provides a small environmental load and is inexpensive.

PREFERRED MODE FOR CARRYING OUT THE INVENTION

Figure 1:
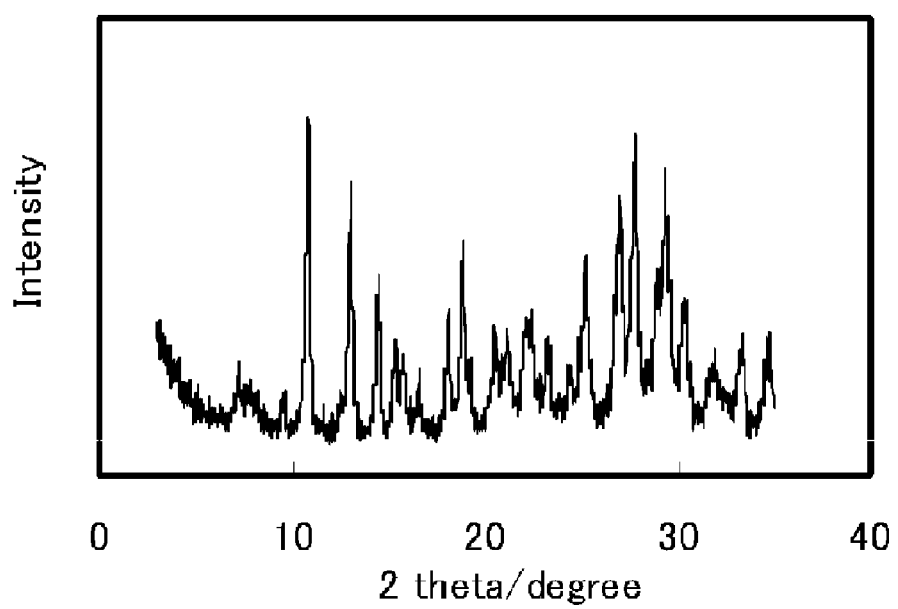
FIG. 1 is an XRD diffraction diagram for a seed crystal of a PAU zeolite used in Example 1.

Hereinafter, the present invention will be described based on preferred embodiments thereof. A PAU zeolite synthesized according to the present invention essentially contains no organic substances in a non-heat-treated state. The organic substances used herein mainly include a quaternary ammonium compound used as an organic structure defining agent (OSDA) to synthesize a zeolite. An ion that makes charge compensation for a negative charge of four-coordinated aluminum of a aluminosilicate skeleton and is present outside the skeleton is a potassium ion, and anything else present in a pore is water or a small amount of adsorption gas. That is, the PAU zeolite synthesized according to the present invention is obtained by a production method that uses no OSDA and will be described below, and thus does not essentially contain organic substances including the OSDA. A $SiO_2/Al_2O_3$ ratio of the aluminosilicate skeleton in the PAU zeolite synthesized according to the present invention is preferably in a range from 3 to 7. Further, an X-ray diffraction diagram of the PAU zeolite synthesized according to the present invention is substantially the same as an X-ray diffraction diagram of a synthetic PAU zeolite reported heretofore. As such, a structural characteristic of the PAU zeolite synthesized according to the present invention is determined to be identical to a conventional PAU zeolite synthesized using the OSDA.

One of characteristics of the production method of the present invention is to make a reaction mixture without adding any OSDA formed of an organic compound at all. That is, an aqueous aluminosilicate gel containing the potassium ion is used as the reaction mixture. It is an essential condition to cause the potassium ion to be present in the reaction mixture of the aqueous aluminosilicate gel. Presence of an alkali metal ion other than the potassium ion, for instance a sodium ion or a lithium ion, is not essential for the production method of the present invention. In this respect, the production method of the present invention is different from a convention production method that is essential for coexistence of the sodium ion and the potassium ion. However, in the production method of the present invention, the use of the sodium ion or the lithium ion is not precluded.

Another characteristic of the production method of the present invention is to use a seed crystal. As the seed crystal, a crystal obtained by firing the PAU zeolite produced by the conventional production method, that is the method of using the OSDA, and removing the organic substances is used. A method of synthesizing the PAU zeolite according to the conventional production method is described in, for instance, Non-patent Documents 1 to 3 described above, and is well known to those skill in the art. In the method of synthesizing the PAU zeolite according to the conventional production method, a type of the OSDA to be used is not limited. Generally, when a tetraethylammonium ion is used as the OSDA, the PAU zeolite can be successfully produced.

In the synthesis of the seed crystal, it is preferable to add an alkali metal ion while adding the OSDA to an alumina source and a silica source. As the alkali metal ion, both the sodium ion and the potassium ion are preferably used. When the PAU zeolite is synthesized in this way, the PAU zeolite is fired, for instance, in the air at a temperature of 500° C. or more before the PAU zeolite is used as the seed crystal, removing the OSDA incorporated into the crystal. When the method of the present invention is carried out using the seed crystal from which the OSDA is not removed, the organic substance is mixed into drainage after reaction completion. Further, the OSDA may be contained in the PAU zeolite to be created, which is against the spirit of the present invention.

In the production method of the present invention, the PAU zeolite obtained according to the present invention can also be used as the seed crystal. The PAU zeolite obtained by the present invention essentially contains no organic compounds. As such, when the PAU zeolite is used as the seed crystal, there is an advantage in that it is unnecessary to fire the PAU zeolite in advance.

Regardless of the case of using the PAU zeolite obtained according to the conventional production method and the case of the PAU zeolite obtained according to the present invention, the $SiO_2/Al_2O_3$ ratio of the seed crystal is in a range from 4 to 15, and preferably a range from 6 to 10. When the $SiO_2/Al_2O_3$ ratio of the seed crystal is smaller than 4, this is inefficient because a crystallization rate of the PAU zeolite is very slow. On the other hand, when the $SiO_2/Al_2O_3$ ratio of the seed crystal is greater than 15, the synthesis of the PAU zeolite is difficult.

An amount of addition of the seed crystal is in a range from 0.1 to 20% by weight, and preferably a range from 1 to 10% by weight with respect to a silica component in the reaction mixture. The amount of addition of the seed crystal is preferably small under condition that the addition amount is in such a range, and the addition amount is determined in consideration of a reaction rate or an effect of suppressing impurities.

A mean particle size of the seed crystal is set to 100 nm or more, preferably 100 to 2000 nm, and more preferably 200 to 1100 nm. Sizes of crystals of the zeolites obtained by synthesis are not generally uniform, and have a certain degree of particle size distribution. It is not difficult to obtain a crystal particle size having a greatest frequency among them. The mean particle size indicates a particle diameter of the crystal of the greatest frequency in the observation based on a scanning electron microscope. To synthesize the particle less than 100 nm, a special device is frequently required, which makes the zeolite expensive. Accordingly, in the prevent invention, the PAU zeolite having a mean particle size of 100 nm or more is used as the seed crystal. Depending on the mean particle size of the seed crystal, an effect on a crystallization rate or a size of a created crystal may be produced, but a difference in the mean particle size of the seed crystal does not substantially interfere with the synthesis of the PAU zeolite.

The reaction mixture to which the seed crystal is added is obtained by mixing a silica source, an alumina source, an alkali source, and water so as to have a composition represented by a molar ratio given below. When the composition of the reaction mixture is beyond this range, as is obvious from the results of comparative examples to be described below, the intended PAU zeolite cannot be obtained, and another zeolite, for instance an MER zeolite, is created instead.

$SiO_2/Al_2O_3$=8 to 24
$K_2O/SiO_2$=0.3 to 0.7
$H_2O/SiO_2$=5 to 50

A more preferable range of the composition of the reaction mixture is as follows.

$SiO_2/Al_2O_3$-8 to 20
$K_2O/SiO_2$=0.35 to 0.65
$H_2O/SiO_2$=10 to 30

A silica source used to obtain the reaction mixture having the molar ratio may include a silicon-containing compound that can create a silicate ion among silica, the others, and water. To be specific, the silica source may include wet process silica, dry process silica, colloidal silica, sodium silicate, and an aluminosilicate gel. These silica sources may be used independently or by combining two types or more. It is preferable to use the silica (silicon dioxide) among these silica sources in the point that the intended zeolite can be obtained without an unnecessary by-product.

As the alumina source, for instance, an aqueous aluminum-containing compound or powdered aluminum may be used. The aqueous aluminum-containing compound may include potassium aluminate, aluminum nitrate, and aluminum sulfate. Further, aluminum hydroxide is also one of the alumina sources. These alumina sources may be used independently or by combining two types or more. It is preferable to use the powdered aluminum, the potassium aluminate, or the aluminum hydroxide among these alumina sources in the point that the intended zeolite can be obtained without an unnecessary by-product (for instance, sulfate or nitrate).

As the alkali source, for instance, potassium hydroxide may be used. When potassium silicate is used as the silica source or when potassium aluminate is used as the alumina source, potassium that is an alkaline metal component included therein is regarded as KOH, and is an alkaline component. Accordingly, $K_2O$ described above is calculated as the sum of all the alkaline components in the reaction mixture. As described previously, it is essential to use the potassium as the alkaline metal used as the alkali source, and an alkaline metal ion other than the potassium ion, for instance a sodium ion or a lithium ion, is not essential for the production method of the present invention.

For an addition sequence of the raw materials when the reaction mixture is prepared, a method of easily obtaining a uniform reaction mixture may be employed. For example, the alumina source and the alkali source are added to and dissolved in water under room temperature, and then the silica source is added and mixed by agitation. Thereby, the uniform reaction mixture can be obtained. The seed crystal is added before the silica source is added or after the mixture of the silica source. Afterwards, the seed crystal is agitated and mixed to be uniformly dispersed. A temperature when the reaction mixture is prepared is not particularly limited, and the reaction mixture may generally be prepared at room temperature (20 to 30° C.)

The reaction mixture containing the seed crystal is put into, heated and reacted in an airtight container, and crystallizes a PAU zeolite under autogenous pressure. No OSDA is included in the reaction mixture. The seed crystal is used without organic substances such as OSDA by performing the process such as firing on that obtained by the method described in Patent Document 1 to 3 above.

When crystallized using the reaction mixture containing the seed crystal, the PAU zeolite is aged and then heated, which is preferable because the crystallization is readily advanced. The aging refers to a process of holding the reaction mixture at a lower temperature than a reaction temperature for a given time. In the aging, the reaction mixture generally stands still without being agitated. It is known that, by performing the aging, effects of preventing impurities from being secondarily produced, making heating possible under agitation without the secondary production of the impurities, and raising a reaction rate are exerted, but an action mechanism is not always clear. A temperature and time for the aging are set such that such effects are exerted to the utmost extent. In the present production method, the aging is preferably performed at 20 to 100° C., more preferably 20 to 80° C., and still more preferably 20 to 60° C. in a range from 2 hours to one day.

When the reaction mixture is agitated to make its temperature uniform, the reaction mixture is agitated in an airtightly heating process after the aging is performed, and then the secondary production of the impurities can be prevented. The agitation can be performed by mixture caused by agitating blades or rotation of a container. Agitation strength and the number of rotations may be adjusted depending on temperature uniformity or a secondary production condition of the impurities. Intermittent agitation rather than normal agitation will do. In this way, the aging and the agitation are combined, and thereby industrial mass production is made possible.

Regardless of the case of performing the crystallization in a still standing state and the case of performing the crystallization in an agitated state, a heating temperature is in a range of 80 to 200° C., preferably 100 to 150° C., and more preferably 120 to 150° C. This heating is done under autogenous pressure. Since the crystallization rate becomes extremely slow at a temperature less than 80° C., creating efficiency of the PAU zeolite becomes bad. On the other hand, since an autoclave having high pressure capacity is required at a temperature exceeding 200° C., economical efficiency is reduced, and a generation rate of the impurities becomes fast. The heating time is not critical in the present production method, and the heating may be performed until the PAU zeolite having sufficiently high crystallinity is created. Generally, the PAU zeolite having satisfactory crystallinity is obtained by heating of about 5 to 150 hours.

A crystal of the PAU zeolite is obtained by such heating. After heating completion, powder of the created crystal is separated from a mother liquid by filtering, and then is cleaned with water or warm water and is dried. Since the crystal essentially contains no organic substances in the as-dried condition, the firing is not required, and the crystal can be used as an adsorbent by dehydration. Further, when the crystal is used as a solid acid catalyst, for instance, a $K^+$ ion in the crystal is exchanged for a $NH_4^+$ ion, and then the crystal is fired. Thereby, the crystal can be used as an $H^+$ type.

The PAU zeolite obtained by the present production method can be properly used, for instance, as various catalysts such as a catalyst for olefin synthesis in the petrochemical industry or an adsorption separating agent in various industrial fields.

EXAMPLES

Hereinafter, the present invention will be described in greater detail by examples.

However, the scope of the present invention is not limited to such examples. Unless mentioned otherwise, "%" refers to "% by weight." Analyzers used in the examples, comparative examples, and reference examples below are as follows.

Powder X-ray diffraction device: MO3XHF[22] (radiation of CuK α-ray, voltage of 40 kV, current of 30 mA, scan step of 0.02°, and scan speed of 2°/min) made by Mac Science Co. Ltd.

Composition analysis device: ICP-AES LIBERTY Series II made by Varian Co. Ltd.

Scanning electron microscope: Field emission scanning electron microscope S-4800 made by Hitachi High-Technologies Co. Ltd.

Example 1

(1) Synthesis of Seed Crystal

Tetraethylammonium hydroxide (TEAOH) was used as an OSDA. Further, aluminum hydroxide and aluminum sulfate were used as an alumina source, and colloidal silica (LUDOX, HS-40) was used as a silica source. Furthermore, sodium hydroxide and potassium hydroxide were used as an alkali source. These were dissolved in water, obtaining a reaction mixture. A composition of the obtained reaction mixture was 1 M potassium hydroxide, 1.2 M sodium hydroxide, 2.6 M TEAOH, 1 M alumina, 9 M silica, and 135 M water. After the reaction mixture was aged under room temperature for 24 hours, the reaction mixture was put into an autoclave formed of stainless steel having a lining of polytetrafluoroethylene, and was heated in an agitated state at 120° C. for 408 hours. A PAU zeolite (hereinafter referred to as "ECR-18") was synthesized by the heating. The ECR-18 was put into an electric furnace, fired at 550° C. for 10 hours while being in circulation of air, and removed the TEAOH. Thereby, organic substance-free ECR-18 was produced. The ECR-18 was observed by a scanning electron microscope, so that a mean particle size was 1.06 μm. As a result of composition analysis, a $SiO_2/Al_2O_3$ ratio was 7.5. An X-ray diffraction diagram of the fired ECR-18 is shown in FIG. 1. The fired ECR-18 in which no organic substances were contained was used as a seed crystal.

(2) Synthesis of PAU Zeolite

Figure 2:
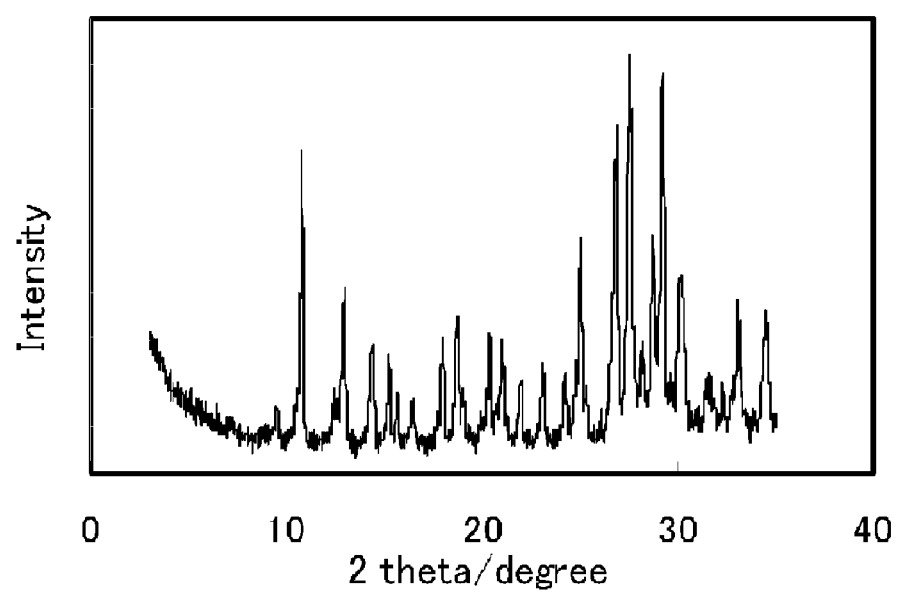
FIG. 2 is an XRD diffraction diagram for the seed crystal of the PAU zeolite obtained in Example 1.

Powdered aluminum of 0.081 g and 50% potassium hydroxide aqueous solution of 2.020 g were dissolved in pure water of 2.477 g, obtaining an aqueous solution. 2.252 g colloidal silica (LUDOX, HS-40) and 0.090 g seed crystal were mixed, and the mixture was added to the aqueous solution bit by bit, agitated and mixed. A composition of a gel after the mixture was as shown Table 1. Further, an amount of addition of the seed crystal was 10% with respect to a silica component in the gel. A mixture of the gel and the seed crystal was put into a 23 cc airtight container formed of stainless steel, and was intactly heated under autogenous pressure at 135° C. for three days in a still standing state without aging and agitating. After the airtight container was cooled, a product was filtered, and cleaned with warm water, obtaining white powder. As a result of performing X-ray diffraction measurement on the product, the product was as shown in FIG. 2, and was confirmed that it was an impurity-free PAU zeolite. In the PAU zeolite, a $SiO_2/Al_2O_3$ ratio is shown in Table 1.

Examples 2 to 7

Examples 2 to 7 were made identical to Example 1 except employing the conditions shown in Table 1, obtaining a PAU zeolite.

Figure 3:
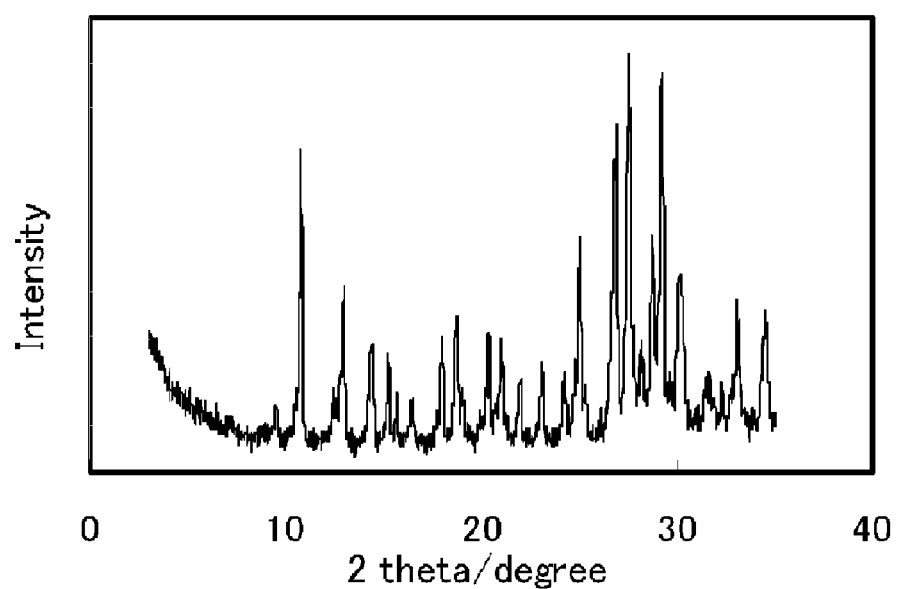
FIG. 3 an XRD diffraction diagram for a seed crystal of a PAU zeolite obtained in Example 2.

However, with regard to Examples 3 to 6, in addition to the PAU zeolite, a small amount of LTL and MER zeolites were observed as a by-product. With regard to Example 2 in which only the PAU zeolite is created, a $SiO_2/Al_2O_3$ ratio was measured. A result thereof is shown in Table 1. Further, an X-ray diffraction diagram of the PAU zeolite obtained in Example 2 is shown in FIG. 3.

Comparative Example 1

The present comparative example was an example in which a zeolite was synthesized without using a seed crystal. Powdered aluminum of 0.081 g and 50% potassium hydroxide of 2.020 g were dissolved in pure water of 2.477 g, obtaining an aqueous solution. 2.252 g colloidal silica (LUDOX, HS-40) was added to the aqueous solution bit by bit, agitated and mixed. A composition of a gel after the mixture was as shown Table 2. The gel was put into a 23 cc airtight container formed of stainless steel, and was intactly heated under autogenous pressure at 135° C. for 72 hours in a still standing state without aging and agitating. After the airtight container was cooled, a product was filtered, and cleaned with warm water, obtaining white powder. A result of performing X-ray diffraction measurement on the product, it was confirmed that the product was an LTL zeolite, but creation of a PAU zeolite was not confirmed.

Comparative Examples 2 and 3

Like Comparative Example 1, the present comparative examples were also examples in which a zeolite was synthesized without using a seed crystal. To be specific, the present comparative examples were made identical to Comparative Example 2 except employing the conditions shown in Table 2, and performed a reaction. A result of performing X-ray diffraction measurement on an obtained product, it was confirmed that the product was an LTL zeolite, but creation of a PAU zeolite was not confirmed.

Comparative Examples 4 and 5

The present comparative examples were examples in which the same seed crystal as Example 1 was used, but a composition of a reaction mixture (gel) was different from that of Example 1. To be specific, the present comparative examples were made identical to Example 1 except employing the reaction mixture having the composition shown in Table 2, and performed a reaction. A result of performing X-ray diffraction measurement on an obtained product, it was confirmed that the product was an MER zeolite, but creation of a PAU zeolite was not confirmed.

TABLE 1

| Example | Composition of reaction mixture | | | Seed crystal | | Heating conditions | | Agitation Number of rotations | Product | |
| | $SiO_2/Al_2O_3$ | $K_2O/SiO_2$ | $H_2O/SiO_2$ | $SiO_2/Al_2O_3$ | Amount of addition (wt %) | Temperature (° C.) | Time (h) | (rpm) | Zeolite | $SiO_2/Al_2O_3$ |
|---|---|---|---|---|---|---|---|---|---|---|
| 1 | 10 | 0.50 | 20 | 7.5 | 10 | 135 | 72 | 0 | PAU zeolite | 4.8 |
| 2 | 10 | 0.55 | 20 | 7.5 | 10 | 135 | 72 | 0 | PAU zeolite | 4.5 |
| 3 | 10 | 0.40 | 20 | 7.5 | 10 | 135 | 48 | 0 | PAU zeolite + LTL zeolite | — |
| 4 | 10 | 0.30 | 20 | 7.5 | 10 | 135 | 72 | 0 | PAU zeolite + LTL zeolite | — |
| 5 | 10 | 0.60 | 20 | 7.5 | 10 | 135 | 48 | 0 | PAU zeolite + MER zeolite | — |
| 6 | 15 | 0.50 | 20 | 7.5 | 10 | 135 | 72 | 0 | PAU zeolite + LTL zeolite | — |
| 7 | 20 | 0.50 | 20 | 7.5 | 10 | 135 | 72 | 0 | PAU zeolite + LTL zeolite | — |

TABLE 2

| Comparative Example | Composition of reaction mixture | | | Seed crystal $SiO_2/Al_2O_3$ | Amount of addition (wt %) | Heating conditions | | Agitation Number of rotations (rpm) | Product |
|---|---|---|---|---|---|---|---|---|---|
| | $SiO_2/Al_2O_3$ | $K_2O/SiO_2$ | $H_2O/SiO_2$ | | | Temperature (° C.) | Time (h) | | |
| 1 | 10 | 0.50 | 20 | — | 0 | 135 | 72 | 0 | LTL zeolite |
| 2 | 10 | 0.55 | 20 | — | 0 | 135 | 72 | 0 | LTL zeolite |
| 3 | 15 | 0.50 | 20 | — | 0 | 135 | 72 | 0 | LTL zeolite |
| 4 | 6 | 0.45 | 20 | 7.5 | 10 | 135 | 72 | 0 | MER zeolite |
| 5 | 5 | 0.60 | 20 | 7.5 | 10 | 135 | 72 | 0 | MER zeolite |

As is obvious from the comparison of Tables 1 and 2, a specified PAU zeolite is used as a seed crystal, and the PAU zeolite is added to a reaction mixture having a specified composition, performing crystallization. Thereby, it is found that the PAU zeolite is obtained. In contrast, when no seed crystal is used (Comparative Examples 1 to 3) and when, in spite of using the seed crystal, a $SiO_2/Al_2O_3$ ratio is low in the reaction mixture (Comparative Examples 4 and 5), it is found that the PAU zeolite is not created, and another zeolite is created instead of this.

The invention claimed is:

1. A method for producing a PAU zeolite comprising:
(1) mixing a silica source, an alumina source, an alkali source, and water so as to be a reaction mixture having a composition represented by a molar ratio given below;
$SiO_2/Al_2O_3$=8 to 24
$K_2O/SiO_2$=0.3 to 0.7
$H_2O/SiO_2$=5 to 50
(2) using an organic compound-free PAU zeolite, in which the $SiO_2/Al_2O_3$ ratio ranges from 4 to 15 and a mean particle size is equal to or more than 100 nm, as a seed crystal, and adding the organic compound-free PAU zeolite to the reaction mixture at a rate of 0.1 to 20% by weight with respect to a silica component in the reaction mixture; and
(3) airtightly heating the reaction mixture to which the seed crystal is added at 80 to 200° C.

2. The method according to claim 1, wherein
the reaction mixture is agitated in the airtightly heating process.

3. The method according to claim 1, further comprising aging the reaction mixture under a temperature of 20 to 100° C. prior to heating the reaction mixture.

4. The method according to claim 3, wherein
the reaction mixture is agitated in the airtightly heating process.

5. The method according to claim 1, further comprising:
(1) mixing a silica source, an alumina source, an alkali source, and water so as to be a reaction mixture having a composition represented by a molar ratio given below;
$SiO_2/Al_2O_3$=8 to 20
$K_2O/SiO_2$=0.35 to 0.65
$H_2O/SiO_2$=10 to 30
(2) using an organic compound-free PAU zeolite, in which the $SiO_2/Al_2O_3$ ratio ranges from 4 to 15 and a mean particle size is equal to or more than 100 nm, as a seed crystal, and adding the organic compound-free PAU zeolite to the reaction mixture at a rate of 0.1 to 20% by weight with respect to a silica component in the reaction mixture; and
(3) airtightly heating the reaction mixture to which the seed crystal is added at 100 to 150° C.

6. The method according to claim 5, further comprising aging the reaction mixture under a temperature of 20 to 100° C. prior to heating the reaction mixture.

7. The method according to claim 5, wherein
the reaction mixture is agitated in the airtightly heating process.

* * * * *